United States Patent [19]

Harter, III et al.

[11] 4,186,070

[45] Jan. 29, 1980

[54] METHOD FOR TREATING A FLUID BY ELECTRON EMISSION

[75] Inventors: Joseph W. Harter, III, Los Angeles; Stuart W. Beitzel, Santa Monica, both of Calif.

[73] Assignee: 0-3 Company, Santa Ana, Calif.

[21] Appl. No.: 964,828

[22] Filed: Nov. 30, 1978

Related U.S. Application Data

[62] Division of Ser. No. 837,022, Sep. 27, 1977.

[51] Int. Cl.$^2$ .............................................. C01B 13/10
[52] U.S. Cl. ..................................... 204/176; 204/164
[58] Field of Search ................. 204/164, 176; 250/534, 250/540, 541

[56] References Cited

U.S. PATENT DOCUMENTS

| | | | |
|---|---|---|---|
| 4,049,707 | 9/1977 | Harter et al. | 250/531 |
| 4,051,043 | 9/1977 | Harter et al. | 204/176 |

*Primary Examiner*—T. M. Tufariello
*Attorney, Agent, or Firm*—Edward D. O'Brian

[57] ABSTRACT

A cell or apparatus for treating a fluid by electron emission as the fluid is passed through a space between a dielectric layer located on a surface of a first electrode and a second electrode and as the electrodes are operated by an attached, appropriate circuit to cause electron emission within the space can be constructed so as to improve the efficiency of the cell or apparatus and so as to promote the amount of time which the dielectric layer may be used without breakdown. In constructing a cell or apparatus for this purpose cooling jackets are provided for circulating cooling fluids in contact with the surfaces of these electrodes remote from one another. In accordance with the disclosure the pressures of the fluids used in the cooling jackets and the fluid passing through the space of the apparatus or cell are regulated so as to maintain the electrical characteristics of the cell or apparatus substantially constant. This improves the efficiency of the circuit used to power the cell. In achieving such regulation the pressures are also preferably regulated so that there is substantially no deflection or movement of the dielectric layer. This minimizes the chances of such dielectric layer breaking down.

4 Claims, 5 Drawing Figures

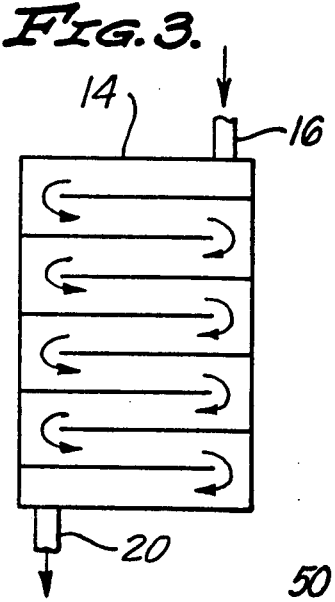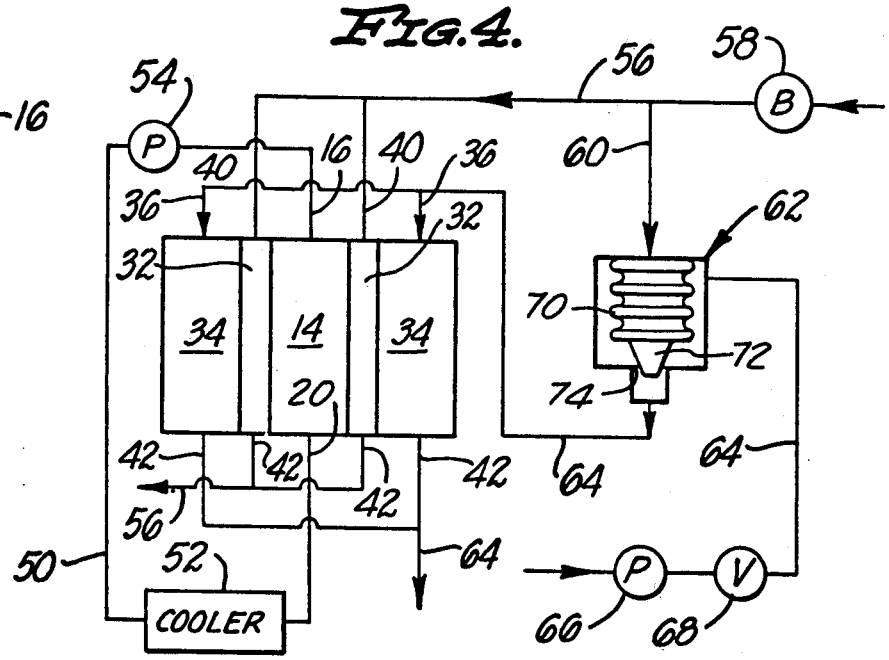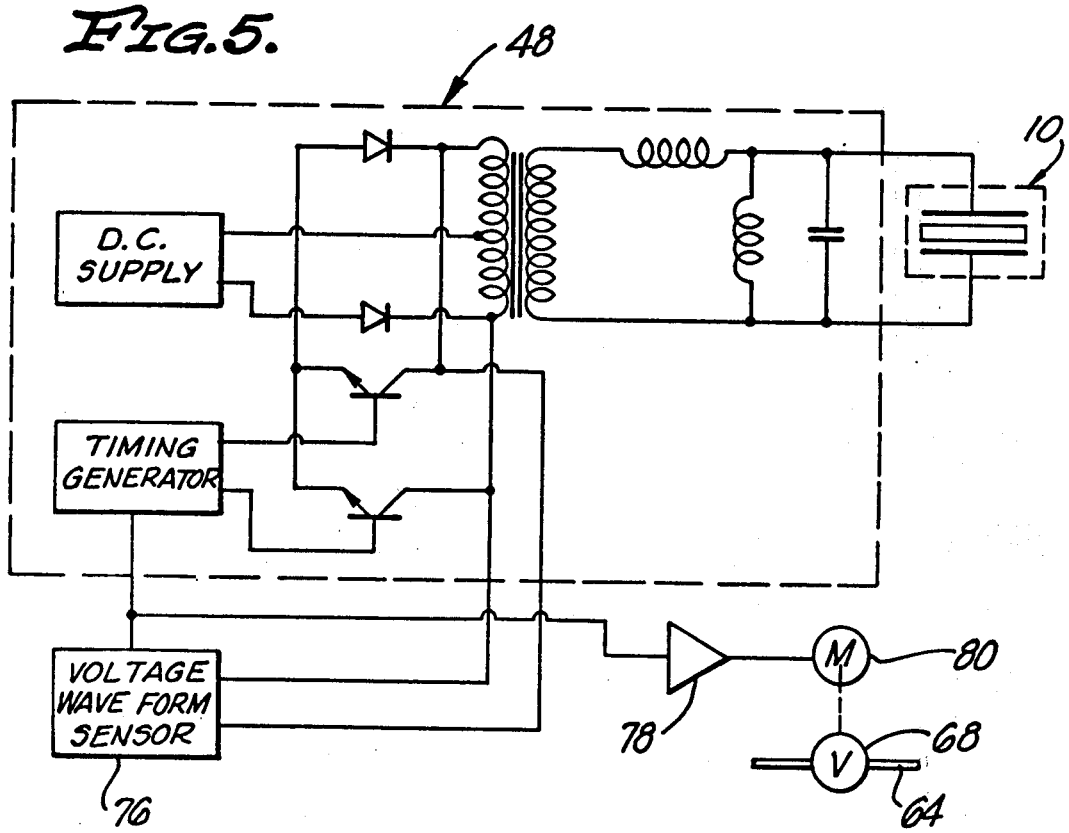

METHOD FOR TREATING A FLUID BY ELECTRON EMISSION

This application is a division of application Ser. No. 837,022 filed Sept. 27, 1977.

CROSS REFERENCE TO RELATED APPLICATIONS AND PATENTS

This application contains subject matter which is related to the subject matter of the Harter et al. U.S. patent application Ser. No. 659,929 now U.S. Pat. No. 4,049,707 issued Sept. 20, 1977, entitled "APPARATUS FOR FLUID TREATMENT BY CORONA DISCHARGE". The entire disclosure of this application Ser. No. 659,929 is incorporated herein by reference.

This application contains subject matter which is related to the subject matter of the Harter et al. U.S. patent application Ser. No. 652,633 issued as U.S. Pat. No. 4,051,043 on Sept. 27, 1977, entitled "APPARATUS FOR FLUID TREATMENT BY ELECTRON EMISSION". The entire disclosure of this application Ser. No. 652,633 is incorporated herein by reference.

BACKGROUND OF THE INVENTION

The invention set forth in this specification pertains to a new and improved method and apparatus for treating a fluid by electron emission. It is commonplace to refer to such treatment as treatment by corona discharge. The invention is primarily directed toward a method and apparatus for the production of ozone but is of such a character that it is considered to be applicable to the treatment of a variety of different fluids in connection with the production of a number of different products.

It is well known to treat a fluid such as air, oxygen enriched air or pure oxygen by electron emission or corona discharge by passing the fluid through the space between a dielectric layer located on the surface of a first electrode and a second electrode while an appropriate circuit is used in order to cause electron emission or corona discharge within the space. As an apparatus or cell of this type is operated normally a significant amount of heat is developed and this heat causes expansion of the materials present within an apparatus or cell including the parts indicated in the preceding. Since the heat buildup within such an apparatus or cell is considered detrimental to the production of certain compounds such as ozone it is known to cool the apparatus or cell used.

Such cooling can, of course, be accomplished in a number of ways. Most commonly it has been established by circulating cooling fluids past surfaces within a cell or apparatus as noted which are remote from the space where the electron emission or corona discharge occurs. While such cooling as conventionally carried out is desirable in improving the efficiency of cell performance it does not serve to optimize cell efficiency to a desired extent.

This is related to the fact that a cell for fluid treatment by electron emission or corona discharge as used with an electrical circuit connected to the electrodes in such a cell for the purpose of causing electron emission or corona discharge in effect acts as a component of such an electrical circuit. As the cell or apparatus is operated by such a circuit it can be considered as a capacitance connected into such a circuit. It can also be considered as a network including several capacitors, a resistor and a bidirectional zener diode connected into such a circuit as a part of such a circuit. When there is a variation in the electrical characteristics of such a cell such a variation will affect the operation of the connected "driving" circuit. This may alter the frequency of the pulses supplied to the cell and/or wave form of the pulses supplied to the apparatus or cell. Normally any such variation in the operation of the circuit used to operate the cell will detrimentally affect the efficiency. This is particularly the case in connection with circuits such as are shown and described in the aforenoted U.S. Pat. No. 4,051,043.

It is considered obvious any heat buildup within the interior of a cell or apparatus as noted will tend to cause some dimensional changes within the interior of such a cell or apparatus. Such dimensional changes will result from heat caused expansion. Even comparatively minor dimensional changes of this type will affect the capacitance characteristics of the cell or apparatus and to a degree tend to affect other related electrical characteristics growing out of the manner in which such a cell or apparatus operates so as to in effect form a part of the power supply circuit.

Such changes in electrical characteristics are of course minimized by the conventional use of cooling fluids as indicated in the preceding discussion. Even so it is considered that it is effectively impossible to utilize such cooling fluids so as to stabilize the electrical characteristics of an apparatus or cell for fluid treatment by electron emission or corona discharge to a desired extent so as to prevent changes in cell dimensions from changing cell electrical characteristics to the extent necessary to avoid such changes causing an interference in the desired manner of supplying power to such a cell or apparatus.

Further, it is considered that even with known types of cooling the performance of a cell or apparatus as noted is unnecessarily detrimentally affected because of another factor which is related to mechanical stability. In a cell or apparatus as noted the dielectric layer is a critical component as far as cell operation is concerned. A great deal of research and development work has gone into the development of dielectric layers for use in apparatus for fluid treatment by electron emission which are capable of being used over a prolonged period without dielectric breakdown. A particularly desirable type of dielectric for use in such cells or apparatus is set forth in the aforenoted application Ser. No. 652,633 now U.S. Pat. No. 4,051,043.

A dielectric as set forth in this patent is, particularly after use, a rather brittle, somewhat fragile type structure which is apt to be damaged as a result of any physical deformation. Other known dielectrics are normally of a similar character. It is not considered that the present cooling techniques as are employed in connection with cells or apparatus as noted are adequate to minimize heat caused dielectric deformation which will tend to shorten the useful life of the dielectric in an apparatus or cell as noted.

SUMMARY OF THE INVENTION

A broad object of the present invention is to provide a new and improved method and apparatus for treating fluid by electron emission or corona discharge. More specifically the invention is intended to provide a new method and apparatus which tends to optimize the electrical efficiency of a cell or apparatus for this purpose.

Further, the invention is intended to provide a new method and apparatus which tends to promote prolonged dielectric life in such a cell or apparatus. Further objects of the present invention are to provide both a method and apparatus as described in the preceding which are comparatively simple and which are desirable for their intended utilization.

In accordance with this invention the various objectives indicated in the preceding applicable to the method or process aspects of this invention are achieved by providing a process for operating an apparatus for fluid treatment by electron emission connected to a circuit means for causing electron emission in the space between a dielectric layer located on a surface of a first electrode and a second electrode as a fluid is passed through said space and as said first electrode is cooled by a cooling fluid passing through a first cooling jacket in contact with a surface of said first electrode remote from said space and as said second electrode is cooled by a cooling fluid passing through a second cooling jacket in contact with a surface of said second electrode remote from said space in which the improvement comprises:

Regulating the pressures of said cooling fluids in both of said cooling jackets and of fluid within said space with respect to one another so as to vary the pressures exerted by said fluids on the electrodes so that the physical dimensions of said electrodes, said dielectric layer and said space are maintained so that the electrical characteristics of said apparatus remains substantially constant as said circuit means is operated and as fluids are moved through said cooling jacket and through said space.

The various objectives of the present invention pertaining to the apparatus aspects of the invention are achieved by providing in the combination of an apparatus for fluid treatment by electron emission which includes a first electrode, a dielectric layer covering the surface of said first electrode, a second electrode located so as to be spaced from and adjacent to said dielectric layer in order to define a space between said second electrode and said dielectric layer, sealing means positioned between said electrodes for isolating said space from the exterior of said apparatus, separate inlet and outlet means for use in conveying a fluid into and out of said space, first cooling jacket means for passing a cooling fluid in contact with the surface of said first electrode remote from said dielectric layer, second cooling jacket means for passing a cooling fluid in contact with the surface of said second electrode remote from said space and of circuit means connected to said electrodes of said apparatus for causing electron emission in said space as said circuit means is operated and as a fluid is passed through said space the improvement which comprises:

Pressure regulating means for regulating the pressures of cooling fluid in both of said cooling jacket means and of fluid within said space with respect to one another so as to vary pressures exerted by said fluids on said electrodes so that the physical dimensions of said electrodes, said dielectric layer and said space are maintained so that the electrical characteristics of said apparatus remain substantially constant as said circuit means is operated and as fluids are moved through said cooling jacket means and said space.

BRIEF DESCRIPTION OF THE DRAWINGS

Because of the nature of this invention it is considered that it is best more fully explained with reference to the accompanying drawings in which:

FIG. 3 is a diagrammatic view indicating the flow through any of the three cooling jackets employed in the apparatus illustrated in the preceding figures;

FIG. 4 is a diagrammatic view indicating fluid flows and appropriate controls for such flows used in the presently preferred embodiment or form of a complete apparatus in accordance with this invention, this view omitting any connection of this apparatus into a circuit used in operating this apparatus; and FIG. 5 is a block diagram type schematic view indicating a presently preferred embodiment or form of a circuit as is used in connection with an apparatus as illustrated in FIG. 4.

Figure 1:
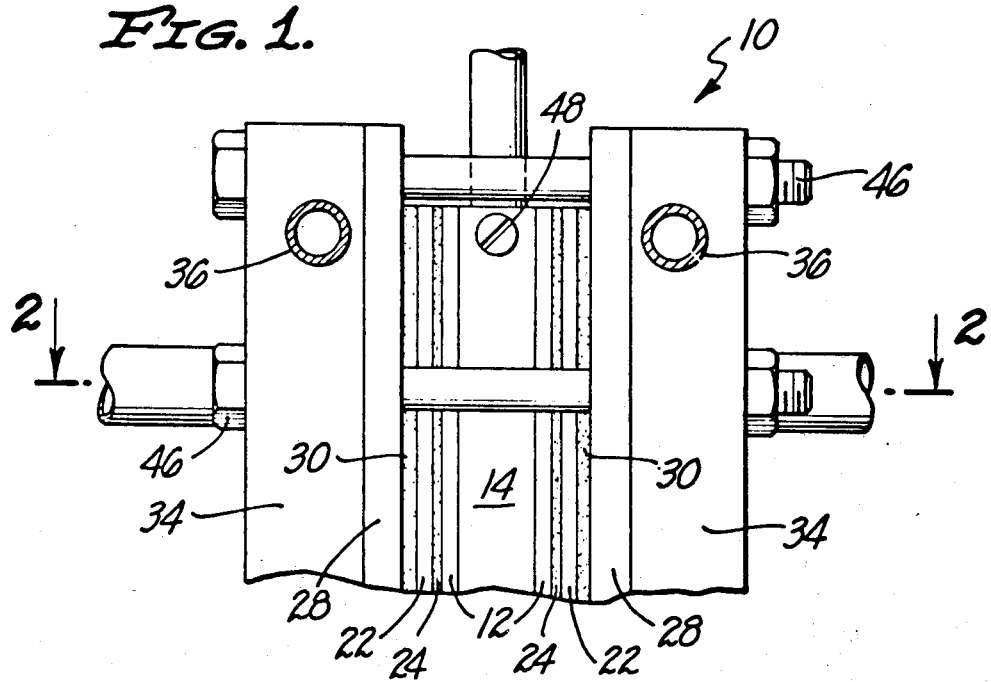
FIG. 1 is a partial side elevational view of an apparatus or cell for treating a fluid by electron emission or corona discharge constructed for use in accordance with this invention.
Figure 2:
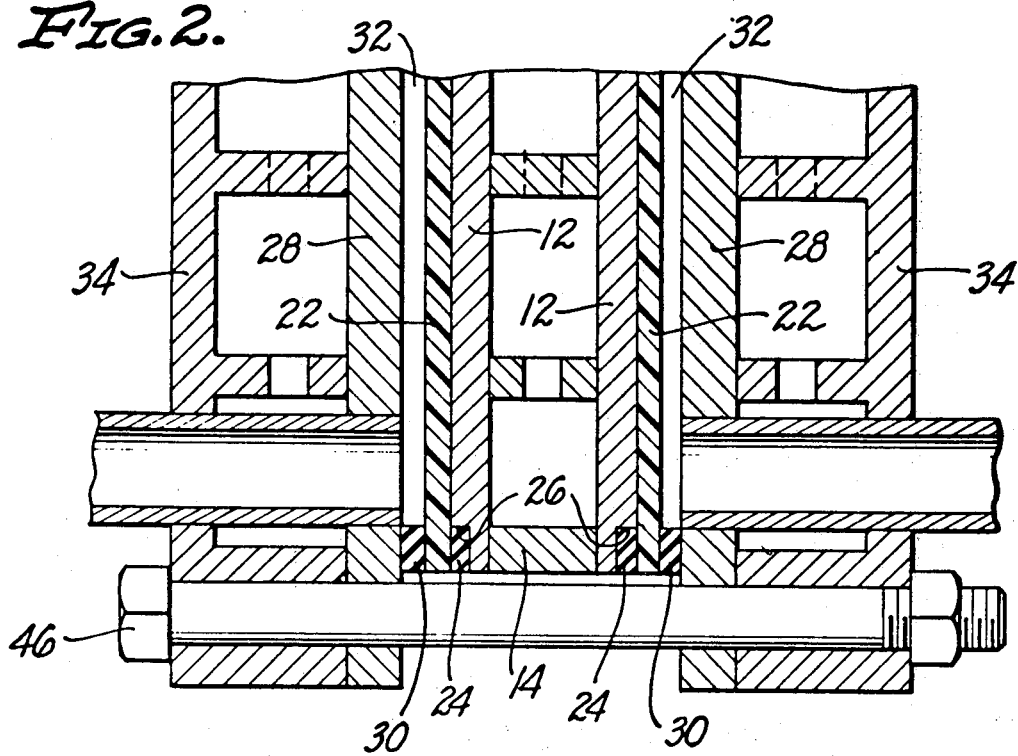
FIG. 2 is a partial cross-sectional view at an enlarged scale taken at line 2—2 of FIG. 1.

The invention described within this specification and utilized with an apparatus and circuit as illustrated in the drawings involves certain essentially intangible concepts or principles as are set forth and defined in the appended claims. Those skilled in the field of fluid treatment by electron emission or corona discharge will be readily able to adapt these concepts or principles for use in differently appearing structures and for use in various different manners through the use or exercise of routine skill in this field. For these reasons the accompanying drawings are not to be considered as limiting the present invention.

DETAILED DESCRIPTION

In the drawings there is shown an apparatus or cell 10 constructed for use in accordance with the present invention. This particular cell 10 is primarily intended for use in the production of ozone from either air, oxygen enriched air or pure oxygen. It can, however, be utilized with other different fluids such as a nitrogen-water vapor mixture in causing various different chemical reactions.

This cell 10 includes two flat, plate-like metal first electrodes 12 which are separated by one another by a framework 14 defining a zig-zag type path as indicated in FIG. 3 between an inlet 16 and an outlet 20. This framework 14 cooperates with the two electrodes 12 so as to define what may be referred to as a first cooling jacket (not separately numbered) for use in conveying a cooling fluid, preferably a dielectric oil with respect to the two electrodes 12 for the obvious purpose of removing heat from these electrodes 12 as the cell 10 is operated.

The surfaces (not separately numbered) of the electrodes 12 remote from the framework 14 are covered with adherent dielectric layers 22. These layers 22 are preferably constructed as set forth in the co-pending application Ser. No. 659,929, now U.S. Pat. No. 4,049,707. The details with respect to these layers 22 are not set forth herein because they are set forth in the noted patent and because various different types of dielectric layers are capable of being utilized with the invention. The dielectrics in the noted patent are of a somewhat fragile, brittle nature. In the event these layers are subjected to any physical deformation or stress there will be a tendency for them to be damaged so as to tend to promote dielectric breakdown. These layers 22 are flat layers of substantially a uniform cross-sectional configuration and are considered quite critical to a cell such as the cell 10 being utilized satisfactorily over a prolonged period. It is considered necessary that these layers 22 be maintained without any significant damage such as might be caused by any physical deformation or stress if the cell 10 is to be utilized satisfactorily over a prolonged period.

As an adjunct to the layers 22 it is considered desirable to also utilize in conjunction with the electrodes 12 and the layers 22 small dielectric spacers 24. These spacers 24 are located in grooves 26 extending completely around the peripheries (not separately numbered) of the electrodes 12, and in effect act as borders for the electrodes 12. These spacers 24 are used so as to minimize edge effects as indicated in the application Ser. No. 659,929, U.S. Pat. No. 4,049,707.

The dielectric layers 22 are separated from other second metal eelctrodes 28 by frame-like elastomeric gaskets 30 such as silicone rubber gaskets which extend completely around the peripheries of the layers 22. These gaskets 30 serve to space the dielectric layers 22 from the second electrodes 28 so as to define an internal space or gap 32 between each of the electrodes 28 and the layer 22 adjacent to it. The dimensions of the gaps 32 are important in obtaining satisfactory results with the cell 10. As hereinafter indicated the dimensions of these gaps 32 may be varied to a limited extent so as to "tune" the cell 10 so that its electrical characteristics are such that a circuit (as hereinafter indicated) used to power this cell 10 operates satisfactorily with the cell 10 in effect forming a part of the circuit.

The surfaces (not separately numbered) of the second electrodes 28 remote from the first electrodes 12 are attached by a conventional adhesive (not shown) to essentially conventional second cooling jackets 34. These jackets 34 are provided with conventional inlets 36 and outlets 38 designed to provide a flow pattern for a cooling fluid such as water of the type indicated in FIG. 3 so as to facilitate the removal of heat from the second electrodes 28. These jackets 34 are also provided with fluid inlets 40 and outlets 42 leading into and from the space or gap 32 at diagonally opposite corners of these spaces 32. The inlets and outlets 40 and 42 are employed for the obvious purpose of conveying fluid to be treated into and out of the gaps 32 within the cell 10.

The cell 10 as a separate unit also includes a conventional electric terminal 44 connected to the framework 14 so that a current can be passed to the first electrodes 12 during the use of the cell 10. With this particular cell 10 the second electrodes 28 are grounded through the jacket 34 and the inlet and outlet pipes 36 and 38. The cell 10 also includes elongated fasteners—bolts—46 passing between the jackets 34 for the purpose of holding the entire cell 10 together as a "sandwich". It is important that these fasteners 46 be adjustable so that the gaskets 30 may be placed under different amounts of compression in order to vary the dimensions of the spaces or gaps 32.

Prior to the cell 10 being utilized it is assembled as indicated. The bolts 46 are then adjusted so that the electrical characteristics of this cell 10 are as desired for use in a particular circuit such as the circuit 48 indicated by a block diagram in FIG. 5 of the drawings. This circuit 48 is not described in detail here since various different circuits are capable of being utilized in practicing this invention. A particular preferred circuit for use in driving or powering the cell 10 is shown and described in U.S. Pat. No. 4,051,043. When the cell 10 is used with a circuit as described in this patent it in effect becomes a part of the circuit. If reasonable electrical efficiencies are to be achieved the cell 10 must be "tuned" to the circuit 48 so as to effectively function as a part of the circuit 48.

After being adjusted as indicated in the preceding the cell 10 is preferably connected to various items of auxiliary equipment as indicated in FIG. 4. Here it is shown that the inlet 16 and outlet 20 are connected into a conventional hydraulic circuit 50 containing a cooler 52 for cooling the cooling fluid and a pump 54. This pump 54 may be a variable pressure pump. However, in the preferred utilization of the present invention it is considered satisfactory to utilize a constant pressure pump 54 so that as hydraulic fluid is circulated a constant pressure will be exerted on the electrodes 12 by the hydraulic fluid employed.

The inlets 40 and the outlets 42 are connected in parallel by lines 56 so as to receive a fluid such as air, an oxygen enriched air or oxygen from a blower 58. Preferably this blower 58 is adjustable so as to be capable of delivering a fluid at a variable pressure. A line 60 leading from a line 56 adjacent to the blower 58 is connected to a conventional regulator 62 used for the purpose of controlling the flow of cooling fluid to the inlets 40 in accordance with the pressure of the fluid supplied by the blower 58. This regulator 62 is connected in series in a conventional line 64 which is adapted to receive a cooling fluid from a conventional pump 66 through a valve 68 so as to supply such cooling fluid to the inlets 36 of the jackets 34. These inlets 36 are connected in parallel to the line 64 as shown. The outlets 42 are similarly connected so as to dispose of the cooling fluid passing through the line 64 in any convenient manner.

The regulator 62 exercises several important functions in accordance with this invention. The particular regulator 62 serves to "sense" the pressure of the fluid being supplied to the spaces or gaps 32 and to regulate the flow to the jackets 34 in accordance with the pressure of the fluid supplied to these spaces or gaps 32. The precise construction of the regulator 62 used for this purpose is considered to be essentially a matter of choice since a number of known regulators can be utilized as the regulator 62.

The particular regulator 62 illustrated employs a bellows-like diaphragm 70 which is moved in accordance with the pressure provided by the blower 58 in order to adjust the position of a valve member 72 relative to an outlet valve seat 74. It will be realized that within such a structure the position of the diaphragm 70 at any particular time will be a function not only of the pressure of the output of the blower 58 but in addition will be a function of the pressure of the cooling fluid supplied to the regulator 62 from the pump 66.

It will be apparent from this that the regulator 62 includes an internal structure as indicated in the preceding which serves as a pressure control means which serves to control the pressure of the cooling fluid supplied to the jackets 34 in accordance with the pressure of the fluid supplied to the gaps or spaces 32. This also results in the performance of another regulating function. Because of the interrelationship between pressures in the jackets 34 and the gaps or spaces 32 these pressures operate within the cell 10 on the dielectric layers 22 and the first electrodes 12. In accordance with this invention the various pressures are maintained within the cell 10 so that there is substantially no deformation of the electrodes 12 and the dielectric layers 22 as the cell 10 is operated. As fluid is supplied to the inlet 16 by varying the fluid pressures delivered to the cell 10 into the jackets 34 and the gaps or spaces 32 such deformation can be prevented.

Such control or variation can be accomplished manually. One manner of accomplishing this when fluid at a constant pressure is supplied to the inlet 16 is indicated in FIG. 5 of the drawing. By a block diagram the circuit 48 is indicated as including a voltage wave form sensor 76 providing a feedback to the remainder of the circuit 48 for use in determining any variation in the electrical characteristics of the cell 10 occurring as the cell 10 is operated.

This sensor 76 is used to provide a signal to an appropriate amplifier 78 used to control the operation of a servo motor 80 serving to operate the valve 68. This type of circuit can be effectively utilized to vary the pressure of the fluid in the line 64 so as to adjust the pressures within the jackets 34 and in the gaps or spaces 32 in order to hold the electrical characteristics of the cell 10 substantially constant.

The importance of such control of pressures within the cell 10 can be realized by considering the operation of the cell 10. As the cell 10 is driven or powered by the circuit 48 and as a fluid is passed through the spaces or gaps 32 heat will be generated generally in the area of the gaps or spaces 32. Such heat will, of course, be "taken up" by the electrodes 12 and 28 and will cause expansion of these electrodes in accordance with the amount that they become heated. This will, of course, change their physical dimensions.

Such change in physical dimensions will obviously cause a change in the capacitance of the cell 10. Although such change in capacitance will normally be comparatively small such change will "feedback" to the circuit 48 in such a manner as to detrimentally affect the efficiency of the operation of the cell 10 in causing desired chemical reactions and hence will be detrimental.

Further, such expansion will create forces tending to mechanically deform the layers 22 located on the electrodes 12. Because of the nature of these layers 22 even minute physical changes in the dimensions of the electrodes 12 to which they are adhered and which serve to support them will be transmitted to these layers 22. This will tend to mechanically affect these layers 22 so as to make them relatively susceptible to dielectric breakdown. Hence, any mechanical deformation of either the layers 22 or the electrodes 12 is detrimental as tending to "expedite" dielectric breakdown. Obviously any such breakdown will tend to shorten the amount of time that a cell such as the cell 10 can be used without maintenance.

In accordance with this invention the various fluids described in the preceding are employed in order to achieve physical forces on both sides (not separately numbered) of each of the electrodes 12 and 28 so as to maintain these electrodes relative to one another in such a manner that the electrical characteristics of the cell 10 are not disturbed as there is heat buildup within the cell 10 and in such a manner that there is no physical deformation of the electrodes 12 which might interfere with the layers 22 so as to shorten the useful, effective lives of these layers 22.

It will be apparent from this that the two types of results achieved in practicing the invention are interrelated. With the present invention the pressures exerted on opposite sides of the electrodes 28 are varied so as to deform these electrodes 28 to some slight extent necessary to maintain electrical characteristics while the pressures on the electrodes 12 are varied only to the extent necessary to maintain these electrodes 12 against physical deformation such as bowing which might be transmitted to the dielectric layers 22.

The cooling employed with the present invention of course controls the degree of temperature caused expansion as the result of cell operation. Such cooling also tends to promote cell efficiency in producing products such as ozone. Although such cooling is effective in these regards it is not considered sufficiently effective so as to obviate the necessity for mechanical control of fluid pressures as indicated in the preceding in achieving economic electrical efficiency and in achieving comparatively long useful dielectric life. This is because the cooling employed does not completely and rapidly "take up" heat generated during the operation of the cell 10 described. Such minor changes in physical dimensions as occur in the cell 10 operated as indicated in the preceding are not considered detrimental.

On occasion cells corresponding to the cell 10 are operated under such conditions that there is sufficient variation in the pressure of the fluid treated within such cells so that the pressure of the fluid within a space or gap such as the space or gap 32 as described in the preceding will tend to cause sufficient deformation of the electrodes used in the cell to affect the electrical characteristics of the cell and/or to cause some physical deformation of the dielectric. The present invention provides a means by which any such fluid pressure caused deformation and/or change can be controlled. Such control is of course achieved in the manner indicated in the preceding by balancing fluid pressures on opposed surfaces of the electrodes so as to maintain substantially unaltered electrical characteristics and so as to prevent deformation of the dielectric used.

We claim:

1. A process for operating an apparatus for fluid treatment by electron emission connected to a circuit means for causing electron emission in a space between a dielectric layer located on a surface of a first electrode and a second electrode as a fluid is passed through said space and as said first electrode is cooled by a cooling fluid passing through a first cooling jacket in contact with a surface of said first electrode remote from said space and as said second electrode is cooled by a cooling fluid passing through a second cooling jacket in contact with a surface of said second electrode remote from said space which comprises:

regulating the pressures of cooling fluids in both of said cooling jackets and of fluid within said space with respect to one another so as to vary the pressures exerted by said fluids on said electrodes so that the physical dimensions of said electrodes, said dielectric layer and said space are maintained so that the electrical characteristics of said apparatus remains substantially constant as said circuit means is operated and as fluids are moved through said cooling jackets and through said space.

2. A process as claimed in claim 1 including:

detecting within said circuit means any change in the electrical characteristics of said apparatus as said apparatus is operated, and regulating the pressure of at least one fluid utilized in said apparatus in accordance with any variation in the electrical characteristics of said apparatus so as to maintain the electrical characteristics of said apparatus substantially constant.

3. A process as claimed in claim 1 wherein: the pressures of said fluids are regulated so that there is no deformation of said dielectric layer.

4. A process as claimed in claim 1 wherein: the pressure of fluid in said first jacket is held constant and the pressures of said fluid in said space and said second jacket are varied in order to control said electrical characteristics and in order to prevent any physical deformation of said dielectric layer.

* * * * *